Oct. 19, 1948.   J. H. HYLER   2,451,677
VEHICLE COUPLING AND POWER STEERING DEVICE
Filed June 29, 1945
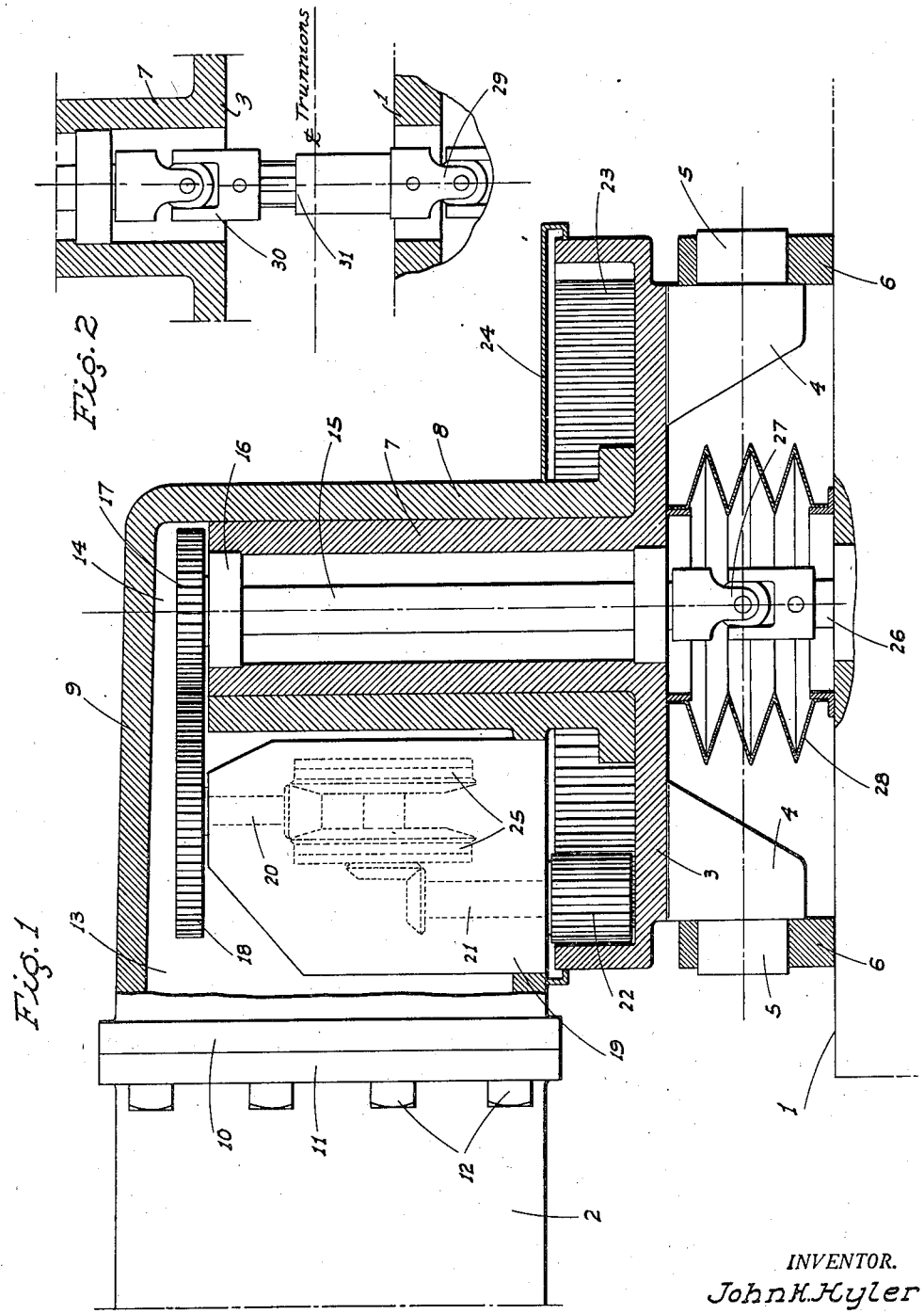
INVENTOR.
John H. Hyler
BY
Webster & Webster
ATTYS Patented Oct. 19, 1948

2,451,677

UNITED STATES PATENT OFFICE 2,451,677

VEHICLE COUPLING AND POWER STEERING DEVICE

John H. Hyler, Peoria, Ill., assignor to R. G. Le Tourneau, Inc., Stockton, Calif., a corporation of California Application June 29, 1945, Serial No. 602,184

5 Claims. (Cl. 180—79.4)

This invention is directed to a device adapted for use in a tractor-trailer vehicle combination to couple the tractor to the trailer for power steering relative to the latter, while at the same time permitting of relative lateral tilting between the tractor and trailer as the vehicle combination traverses uneven ground.

The instant invention represents a modification of the structure shown in copending application, Serial No. 570,530, filed December 30, 1944, now Patent No. 2,400,239, issued May 14, 1946.

One object of the instant invention is to provide a tractor-trailer coupling and power steering device which includes a novel mechanism for transmitting power from the tractor to the coupling and steering assembly of the device, and which assembly is mounted on the tractor at the rear and connected with the draft tongue of the trailer; said assembly being mounted on the tractor for relative lateral tilting, and said power transmitting mechanism including a universal connection arranged so that said relative lateral tilting can occur simultaneously with power steering of the tractor.

Another object of the invention is to incorporate, in a tractor-trailer coupling and power steering device which includes an upstanding tubular member mounted on the tractor for relative lateral tilting movement, driving mechanism comprising an upstanding driven shaft journaled in said tubular member and operative to cause steering of the tractor, a drive shaft upstanding from the tractor below and in substantial alinement with said driven shaft, and a universal connection between said shafts arranged to transmit power to said driven shaft from said drive shaft regardless of said relative lateral tilting.

A further object is to provide a coupling and power steering device, as in the preceding paragraph, in which said universal connection comprises a universal joint disposed, in one embodiment, with its center of universal movement alined with the longitudinal axis of lateral tilting of said upstanding tubular member; or, in a modified embodiment, comprising a pair of vertically spaced universal joints connected together but disposed, respectively, above and below said longitudinal axis substantially in the vertical plane of the latter.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a sectional elevation of the device as coupled between the tractor and a trailer, showing one type of universal connection in the driving mechanism.

Figure 2 is a fragmentary sectional elevation illustrating a modified type of universal connection.

Referring now more particularly to the characters of reference on the drawings, the device is adapted to be connected between the deck 1 at the rear of a tractor and the front end of a rigid, forwardly projecting draft tongue or yoke 2 of a trailer, whereby the tractor is connected in draft and power steerable relation to said trailer; the device comprising the following structure:

A substantially circular base 3 is disposed above the tractor deck 1 in upwardly facing relation, and said base includes, in spaced relation lengthwise of the tractor, a pair of depending legs 4 including oppositely projecting trunnions 5 which are journaled in connection with rigid upstanding brackets 6 on the deck 1. The base 3 is thus mounted for lateral tilting relative to the tractor.

The base 3 is formed, centrally thereof, with an upstanding tubular post 7 about which a sleeve 8 is turnably mounted, said sleeve having a rearwardly projecting housing 9 formed therewith for the enclosure of a portion of the driving mechanism, as will hereinafter appear. At its rear end the housing 9 is formed with a flat, vertical, and normally rearwardly facing attachment plate 10 to which a matching plate 11 on the forward end of the draft tongue or yoke 2 is connected by means of bolts 12. The housing 9 is so constructed that it forms an enclosed chamber 13 between the sleeve 8 and the attachment plate 10, which chamber extends forwardly over the post 7, as indicated at 14.

The driving mechanism, which is arranged to cause relative rotation between the post 7 and sleeve 8, and consequently steering of the tractor relative to the trailer, comprises the following:

An upstanding driven shaft 15 is journaled within the post 7 in bearings 16, the upper end of said shaft projecting into the chamber portion 14 and there being fitted with a gear 17 which runs in mesh with another gear 18 in the chamber 13 adjacent the top thereof. The gear 18 is mounted in driving relation to a reversing gear box 19 rigidly mounted in said chamber 13, and which gear box includes a vertical, upwardly projecting shaft 20 on which the gear 18 is fixed. The gear box also includes a downwardly projecting shaft 21 which extends through the bottom of said gear box, and is there fitted with a pinion 22 which runs in constant mesh with an internal ring gear 23 formed on and upstanding from the periphery of the circular base 3. The ring gear 23 is suitably shielded from above by a hood 24.

While the reversing gear box 19 may be of any suitable type, it is here shown as including a bevel pinion and bevel gear assembly having fluid pressure clutches 25 associated therewith, and through the selective operation of which clutches the shaft 21 may be driven in one direction or the other.

In spaced relation below the circular base 3 the tractor includes an upstanding drive shaft 26 disposed in substantially vertical alinement with the driven shaft 15 in post 7; said shafts being coupled together by a universal joint 27 whose center of universal movement is alined with the longitudinal axis of lateral tilting movement of said base 3, i. e. alined with the axis of trunnions 5. The joint 27, together with the adjacent portions of the shafts 15 and 26, are protected by an accordian sleeve or boot 28 which surrounds the same; said boot being connected at its lower end to the deck 1 and at its upper end to the base 3.

When the above described device is in operation the drive shaft 26 is driven in one direction, causing rotation of the shaft 20 through the medium of universal joint 27, shaft 15, and gears 17 and 18. With shaft 20 rotating, the gear box 19 is controlled, i. e. the clutches 25 are controlled, to cause rotation of the shaft 21 and pinion 22 in one direction or the other, selectively. With rotation of the pinion 22 said pinion and the ring gear 23 move relative to each other, which results in relative rotation between the posts 7 and sleeve 8, producing steering of the tractor relative to the trailer. By reason of the embodiment of the universal joint 27 in the driving mechanism, as described, the drive for the power steering operation is accomplished regardless of the relative lateral tilt between the tractor and the assembly, including base 3, post 7, and sleeve 8. The universal joint 27 effectively imparts the drive of said shaft 26 to shaft 15 even though the latter may be tilted to one side or the other.

In Fig. 2 there is illustrated a modified form of the universal connection, and here it is shown as comprising universal joints 29 and 30 secured to adjacent ends of the shafts 26 and 15, respectively, above and below the longitudinal axis of the trunnions 5 in substantially the vertical plane thereof; said universal joints being connected by means of a spline unit 31. This embodiment of the universal connection serves the same purpose as the universal connection shown in Fig. 1 and permits of the desired relative lateral tilting of the tractor without disturbing the driving mechanism of the power steering device.

From the foregoing description it will be readily seen that there has been produced such a device as substantially fulfills the objects of the invention as set forth herein.

While this specification sets forth in detail the present and preferred construction of the device, still in practice such deviations therefrom may be resorted to as do not form a departure from the spirit of the invention as defined by the appended claims.

Having thus described the invention, the following is claimed as new and useful and upon which Letters Patent are desired:

1. A tractor-trailer draft coupling and power steering device comprising an upstanding post, means adapted to mount the post on the tractor for relative lateral tilting about a longitudinally extending axis, a sleeve rotatably surrounding the post, means adapted to fix the sleeve in connection with the trailer, and driving mechanism, including a universal joint, arranged to cause relative rotation between said post and sleeve regardless of said relative lateral tilt; the universal joint being disposed with its center of universal movement substantially alined with both said longitudinally extending axis and the vertical axis of said post.

2. A tractor-trailer draft coupling and power steering device comprising an upstanding post, means adapted to mount the post on the tractor for relative lateral tilting about a longitudinally extending axis, a sleeve rotatably surrounding the post, means adapted to fix the sleeve in connection with the trailer, a driven shaft journaled in the post, driving connections between the shaft and sleeve operative to cause relative rotation of said post and sleeve, a drive shaft upstanding from the tractor in substantially alined relation to but spaced from the driven shaft, and a universal connection secured between adjacent ends of said shafts, the center of universal movement of the latter connection being in substantial alinement with the axis of tilting movement between the post and the tractor.

3. A tractor-trailer draft coupling and power steering device comprising an upstanding post, means adapted to mount the post on the tractor for relative lateral tilting about a longitudinally extending axis, a sleeve rotatably surrounding the post, means adapted to fix the sleeve in connection with the trailer, a driven shaft journaled in the post, driving connections between the shaft and sleeve operative to cause relative rotation of said post and sleeve, a drive shaft upstanding from the tractor in substantially alined relation to but spaced from the driven shaft, and a universal connection secured between adjacent ends of said shafts; the center of universal movement of said connection being substantially alined with said longitudinally extending axis.

4. In a tractor-trailer draft coupling and power steering device which includes a base member adapted to be mounted on a tractor for relative lateral tilting about a longitudinally extending axis, said axis passing below the base member, a driven shaft upstanding from the base member and journaled therein for rotation relative thereto, the lower end of said shaft terminating adjacent but short of said axis, a drive shaft upstanding from the tractor in cooperative relationship to said driven shaft, the upper end of the drive shaft terminating adjacent but short of said axis, a universal connection coupling adjacent ends of said shafts, the center of universal movement of such connection being substantially alined with said axis, and drive means interconnected between the driven shaft and the base member and including an element adapted to be fixed to a trailer.

5. In a tractor-trailer draft coupling and power steering device which includes a base member adapted to be mounted on a tractor for relative lateral tilting about a longitudinally extending axis, said axis passing below the base member, a driven shaft upstanding from the base member and journaled therein for rotation relative thereto, the lower end of said shaft terminating adjacent but short of said axis, a drive shaft upstanding from the tractor in cooperative relationship to said driven shaft, the upper end of the drive shaft terminating adjacent but short of said axis, a universal connection coupling adjacent ends of said shafts; the center of universal movement of said connection being substantially alined with said axis, and drive means interconnected between the driven shaft and the base member and including an element adapted to be fixed to a trailer.

JOHN H. HYLER.

REFERENCES CITED

The following references are of record in the file of this patent:

UNITED STATES PATENTS

| Number | Name | Date |
|---|---|---|
| 1,957,917 | Storey | May 8, 1934 |
| 2,276,573 | Gustafson | Mar. 17, 1942 |
| 2,362,262 | French | Nov. 7, 1944 |
| 2,368,202 | Clark | Jan. 30, 1945 |
| 2,386,483 | Le Tourneau | Oct. 9, 1945 |
| 2,400,239 | Le Tourneau | May 14, 1946 |